United States Patent

[11] 3,564,138

[72] Inventor William M. Harrold
Kitchener, Ontario, Canada
[21] Appl. No. 680,839
[22] Filed Nov. 6, 1967
[45] Patented Feb. 16, 1971
[73] Assignee Electrohome Limited
Kitchener, Ontario, Canada

[54] LIGHT SHIELD
8 Claims, 2 Drawing Figs.

[52] U.S. Cl. .......... 178/7.9, 178/7.82
[51] Int. Cl. .......... H01j 29/06
[50] Field of Search .......... 178/7.9; D56/4(7); D14/.4; 178/7.82

[56] References Cited
UNITED STATES PATENTS
2,627,067 1/1953 Rose .......... 178/7.9
FOREIGN PATENTS
783,593 9/1957 Great Britain.

*Primary Examiner*—Robert L. Griffin
*Assistant Examiner*—Donald E. Stout
*Attorney*—P.W. Mc Burney

ABSTRACT: An image exhibiting member having a screen at which images appear, preferably a television receiver, is provided in combination with first and second panels positioned one at either side of the screen and projecting forwardly therefrom and a third panel hingedly mounted above the screen for movement in a first plane into cooperating relationship with the first and second panels to provide a light shield for the screen. The third panel has first, second and third segments, the second segment being positioned intermediate the first and third segments. The first and third segments are hingedly connected to the second segment for movement in planes different from the plane of movement of the second segment.

PATENTED FEB 16 1971

3,564,138

WILLIAM M. HARROLD

INVENTOR.

BY

PATENT AGENT

LIGHT SHIELD

This invention relates to a light shield for an image-exhibiting apparatus such as a television receiver, an oscilloscope, a slide viewer or a front or rear projection device and to image-exhibiting apparatus with such a light shield. The invention will be particularly described with reference to a television receiver.

Regulations governing the use of educational television receivers in the Province of Ontario require that the receiver be provided with means to reduce or prevent reflection of light originating externally of the receiver from the glass faceplate of the cathode-ray tube of the receiver. One aspect of the present invention provides such an arrangement.

The present invention provides, in combination, an image-exhibiting member having a screen on which images appear, first and second panels positioned one at either end of the screen and projecting forwardly therefrom, and a third panel hingedly mounted above the screen for movement in a first plane into cooperating relationship with the first and second panels to provide a light shield for the screen, the third panel having first, second and third segments, the second segment being positioned intermediate the first and third segments, the first and third segments being hingedly connected to the second segment for movement in planes different from the plane of movement of the second segment.

Figure 1:
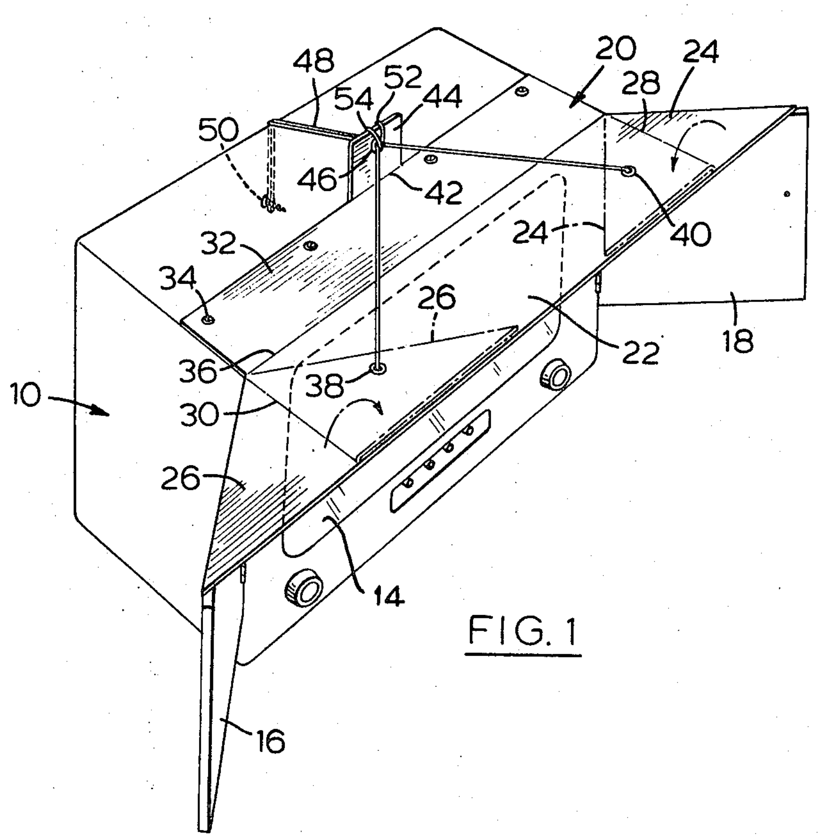
Figure 2:
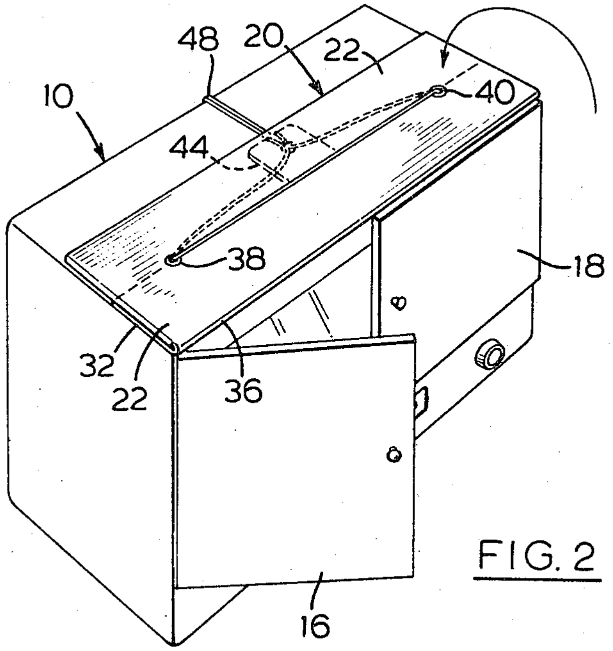

A preferred embodiment of the invention will now be described in detail with reference to the accompanying drawings, in which:

FIG. 1 represents a front view of a television receiver incorporating the combination of the invention in its operative position; and FIG. 2 represents a front view of a television incorporating the combination in its inoperative position.

A television receiver including a cabinet 10 has a picture tube with an image-exhibiting screen located behind the glass faceplate 14 of the tube. The receiver 10 has two panels 16 and 18 hingedly mounted about vertical axes, one panel being located on each side of the faceplate 14. The panels 16 and 18 are of such a size that they may be pivoted inwardly and lie wholly over the surface of the faceplate 14 of the picture tube, thereby providing a protective shield for the faceplate 14 when the receiver is not in use. Mounted above the faceplate 14 is a third panel 10 comprising three segments: a central rectangular segment 22, and two outer triangular segments 24 and 26 each hingedly mounted on the segment 22 along the fold lines 28 and 30, respectively. Panel 20 is mounted above the faceplate 14 by a mounting flange 32 screwed to the top of the cabinet 10 by screws 34 or otherwise affixed thereto. The mounting flange 32 is connected to segment 22 along fold line 36. Piercing segment 22 are holes 38 and 40. Hingedly mounted along line 42 is an upstanding projection 44 that can move from substantially perpendicular to the top of the cabinet 10 to substantially parallel thereto (as indicated by the dotted lines in FIG. 2). The projection 44 could equally well be hingedly mounted along fold line 36. Projection 44 has a hole 46 located near the upper edge thereof. Threaded through holes 38, 40 and 46 is lace 48 and the free ends of lace are secured to the back of the receiver by a screw 50 or otherwise secured thereto. The lace 48 passes through both holes 38 and 40 and is looped through hole 46 and over the top of projection 44 to provide loops 52 and 54. The lace 48 and projection 44 provide a cantilever support for the panel 20 and hold it in the desired position with segments 24 and 26 resting on top of the panels 18 and 16 respectively. The position of the panel 20 can be varied by adjusting the length of the part of lace 48 between hole 46 and screw 50. As shown in FIG. 2, the panel 20 can be stored simply when not in use on top of the receiver by folding the segment 22 onto the top of the cabinet (as indicated by the arrow in FIG. 2) after folding the segments 24 and 26 inwardly (as indicated by the arrows and the dotted lines in FIG. 1). The projection 44 in this position lies underneath segment 22 (as indicated by the dotted lines in FIG. 2). The segments 24 and 26 of the panel 20 allow a wide range of relative positions of panels 16 and 18 and 20 to be chosen. Thus, should panels 16 and 18 be moved inwardly toward the screen, then segments 24 and 26 simply hinge about lines 28 and 30 remaining resting on the top of the panels.

The panel 20 can be constructed of any suitable material but is preferably constructed of thin cardboard. Each segment of the panel 20 and also mounting flange 32 is constructed of a separate piece of cardboard, but an integral unit is created by encasing all the cardboards in a heat-sealable plastic material, such as vinyl material. The vinyl covering is next heat-sealed along lines 28, 30 and 36, as well as around the whole periphery of a panel 20 and mounting flange 32. The heat seals at 28, 30 and 36 effectively form the fold lines along which segments 24, 26, and 22 respectively are hinged. The projection 44 may be similarly constructed of vinyl-coated cardboard and may be heat-sealed around its periphery and to the fold line 36 or at 42. Alternatively, the panel 20 and the projection 44 may be heat-sealed as an integral unit. The seal at 42 forms the hinge line for the projection 44.

Although panel 20 is illustrated having three segments, which are respectively triangle, rectangle, triangle, the panel could equally well be constructed of segments of any convenient geometric shape. Thus, all three segments could be triangles, or all three could be rectangles.

The invention has been illustrated with reference to a portable television receiver. The invention is equally applicable to other image-exhibiting apparatus, such as a wall or other permanently mounted television receiver.

It will be seen from the foregoing that a simple but effective apparatus has been provided as a light shield for a television receiver. With such apparatus light incident from both sides and above the receiver is shielded and the position of the light shielding panels may be easily adjusted. Moreover, if panel 20 is correctly adjusted to the screen light incident on faceplate 14 from above the receiver, movement of panels 16 and 18 to optimize the screening of light incident of faceplate 14 from the sides of the receiver will not vary the position of segment 22. However, the position of panel 20 may be adjusted simply by varying the length of the part of lace 48 between hole 46 and screw 50.

The means provided for holding panel 20 in position are simple and effective. If only lace 48 were employed, projection 44 being eliminated, it would be impossible to hold panel 20 in a position below the horizontal.

An important feature of panel 20 is its ability to lie virtually flat when not in use. The most important feature of panel 20, however, is the use of hinged segments 24 and 26 which permit panels 16 and 18 to be moved without in any way diminishing the light shielding effect of panel 20. Thus, assume segment 22 is inclined just above the horizontal. As panels 16 and 18 are moved inwardly towards each other, segments 26 and 24 riding thereon will increase their inclination towards the vertical but will remain in contact with panels 16 and 18 until these panels register with hinge lines 30 and 28. Thus, segments 24 and 26 move in different planes than the plane in which segment 22 moves.

I claim:

1. In combination, an image-exhibiting member having a screen on which images appear; first and second panels positioned at opposite sides of said screen and projecting forwardly therefrom, said first and second panels mounted, respectively, for pivotal movement about substantially vertical axes at opposite sides of said screen; a third panel hingedly mounted above said screen about a substantially horizontal axis for movement in a first plane into cooperating relationship with said first and second panels to provide a light shield for said screen; said third panel having first, second and third segments, said second segment positioned intermediate said first and third segments, said first and third segments hingedly connected along one side to opposite sides, respectively, of said second segment so that said first and second panels may be moved about their respective hinged axes and said first and third segments will pivot about their hinged axes to remain in cooperative engagement with said first and second panels at all times to maintain said light shield.

2. The combination of claim 1 further including means for maintaining said second segment in any one of a plurality of positions.

3. The combination of claim 2 wherein said means comprises at least one flexible member supporting but extending away from said second segment to a position located above the hinged mounting of said third panel.

4. The combination of claim 2 wherein said means comprises a member extending upwardly from said third panel and a flexible member secured to said second segment, said upwardly extending member and said cabinet at a point on the side of said upwardly extending member rotate from said second segment.

5. The combination of claim 4 wherein said flexible member is a lace.

6. The combination of claim 1 wherein said second segment is a rectangular segment and said first and third segments are triangular segments, said triangular segments being hingedly connected to said rectangular segments one at each end thereof.

7. The combination of claim 4 wherein said upwardly extending member is hingedly connected to said third panel for movement in the same plane as said second segment.

8. The combination of claim 7 wherein said flexible member is a lace, and wherein said second segment is a rectangular segment and said first and third segments are triangular segments, said triangular segments being hingedly connected to said rectangular segments one at each end thereof.